April 28, 1953     W. RYAN, JR., ET AL     2,636,356
REFRIGERATION SYSTEM FOR DELIVERY TRUCKS
Filed Nov. 25, 1949

INVENTORS
WILLIAM RYAN JR.
ALFRED C. RATERMANN

BY *John H. Cassidy*

ATTORNEY

Patented Apr. 28, 1953

2,636,356

UNITED STATES PATENT OFFICE 2,636,356

REFRIGERATION SYSTEM FOR DELIVERY TRUCKS

William Ryan, Jr., and Alfred C. Ratermann, St. Louis County, Mo.

Application November 25, 1949, Serial No. 129,462

7 Claims. (Cl. 62—4)

This invention relates to a refrigeration system for delivery trucks in which mechanical refrigeration is employed to cool a refrigerating or cooling compartment of the truck, power for operation thereof being supplied from the internal combustion engine that furnishes motive power for the truck.

While the invention is defined in the appended claims, a summary statement will assist in understanding those claims and the following detailed description of a preferred embodiment of the invention. Since, however, a part of the invention may be used without the whole, this summary is not to be construed as limiting the invention beyond that defined in the claims.

A delivery truck to which this invention is pertinent includes a cooling compartment or insulated body, and a cab forward of the cooling compartment extending across the vehicle, with a steering wheel and operator's space to one side of the longitudinal median line of the vehicle (on the right side in domestic practice). A door is provided in each side wall of the cab. The truck is driven by an internal combustion engine forward of the cab with a crankshaft arranged longitudinally of the vehicle.

An object of the invention is to provide an efficient mechanical refrigeration system which is operable, when the truck is on the road, to cool the cooling compartment, and which has a novel arrangement to accommodate it to available space. The invention is especially adapted to "stand-up-drive" trucks which are much employed in city milk deliveries, and in which space under the truck body is limited.

To accomplish this object the invention includes a driven shaft extending longitudinally of the vehicle alongside the engine. Transmission sheaves are secured to the forward ends of the crankshaft and the driven shaft, respectively, and connected by a flexible belt or belts. The driven shaft leads rearwardly to a refrigerating unit behind the engine and occupying at least in part a housing in the cab.

The housing occupies a space in the cab to one side of the median line opposite the driver's space, forwardly of the adjacent cab door, and upwardly from the floor of the cab. It is open at its rear to accommodate a condenser which forms a part of the refrigerating unit.

The refrigerating unit, positioned as aforesaid, includes, with the condenser, a compressor and a cooling fan, which are operatively connected with the rear end of the driven shaft by proper power transmission means.

The refrigerating unit preferably includes an electric motor for operating the unit when the truck is at a dock. The transmission means may then include automatic clutches whereby the compressor and fan may be driven either by the truck engine or the electric motor without manual manipulation. A thermo-responsive regulator is preferably provided to control operation of the electric motor according to temperature demands in the compartment to be cooled.

The system may be arranged whereby the compressor will operate continuously when the engine is running, or controls may be employed so that the compressor will operate only when the temperature in the cooling compartment requires it. To accomplish this, a clutch, responsive to temperature conditions in the compartment, may be interposed in the transmission system to connect and disconnect the engine from the unit as required.

The invention may be better understood from the following detailed description of a preferred embodiment, taken with the accompanying drawings.

Figure 1:
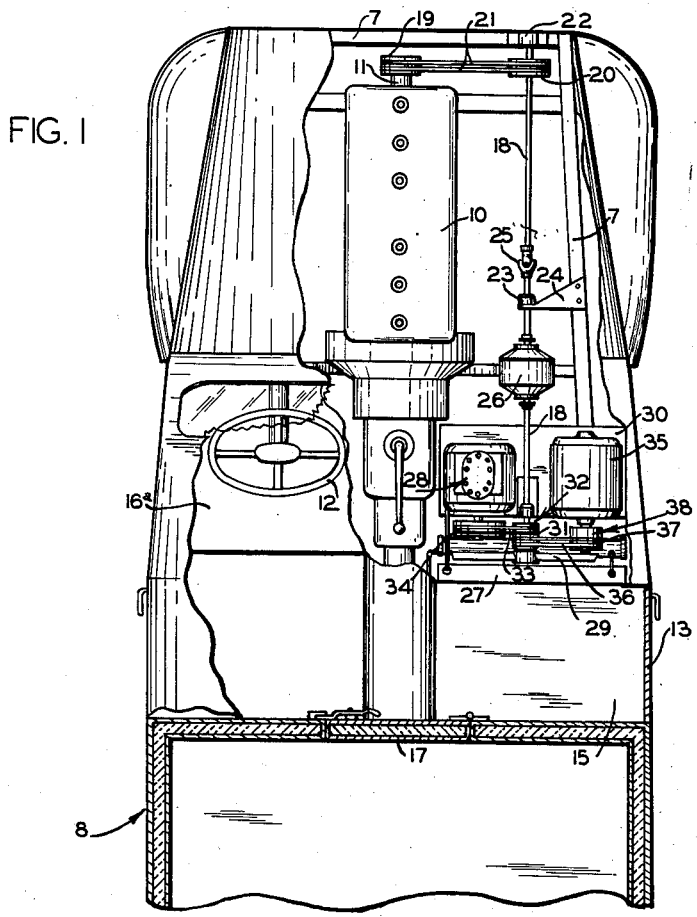
Fig. 1 is a plan view partly in section of a delivery truck provided with a refrigeration system of the present invention.
Figure 2:
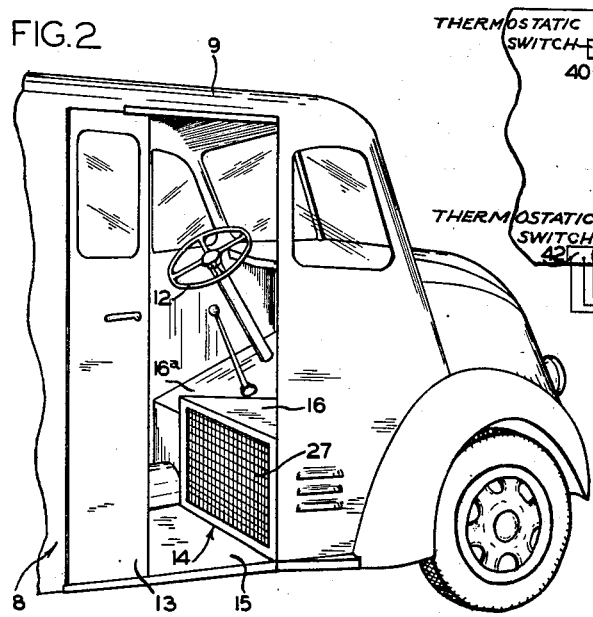
Fig. 2 is a perspective view showing in particular the cab of the truck with arrangements therein.
Figure 3:
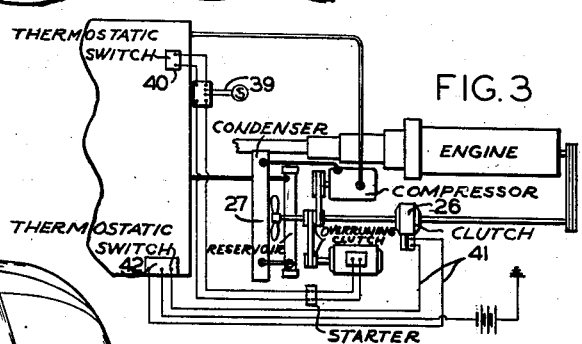
Fig. 3 is a diagram showing the refrigeration system.

The drawings illustrate the invention applied to a familiar type of delivery truck, a "stand-up-drive," which is popularly used for city delivery of milk, and other dairy products. One of the features of this truck is its low hang, which does not allow sufficient space beneath its body to accommodate a refrigerating unit.

The truck includes a frame 7, upon which is mounted an insulated body or cooling compartment 8, a cab 9 forward of said compartment, and an internal combustion engine 10 forward of the cab. The engine has a crankshaft 11 arranged longitudinally of the vehicle.

The cab 9 extends from side to side of the vehicle, is equipped with a steering wheel 12, and provides a space for the operator which is entirely in one half or on one side of the cab and on one side of the median line of the vehicle. The cab is provided with doors 13 on each side, one only of which is shown.

In accordance with this invention, a space in the cab is appropriated to receive a refrigerating unit, which is driven off the front of the crankshaft 11. A housing 14 occupies a space in the cab 9, opposite the operator's space and to one side of the median line of the vehicle, extending forwardly of the door 13, or its opening, and upwardly from the floor 15 of the cab a sufficient distance to accommodate the refrigerating unit which is later described. Preferably, the top of the housing is formed by a horizontal plate 16, displacing in part an inclined plate 16a, which forms a wall between the cab and the engine.

The top 16 of the housing 14 is a convenient bench or table to the side of the operator, at the door 13 and at a door 17, which gives access to the cooling compartment 8.

The refrigerating unit is driven by the engine 10 from the forward end of its crankshaft 11, through a driven shaft or countershaft 18, which extends longitudinally of the vehicle alongside the engine. A transmission sheave 19 is keyed to the forward end of the crankshaft 11, and a sheave 20 is keyed to the forward end of the countershaft 18, the sheaves being connected by one or more flexible belts 21. The forward end of the driven shaft 18 is journalled in a bearing 22 supported by a front member of the frame 7. An intermediate bearing 23 is supported by a bracket 24, secured to a side member of the frame 7.

Although the shaft 18 is shown as broken by a universal joint 25 and an automatic clutch 26 (later described), it may be considered, and is here considered, as a continuous shaft extending from the front of the engine to a point beyond the rear thereof, and connecting with certain driven elements of the refrigerating unit.

The refrigerating unit includes a condenser 27, a compressor 28, and a cooling fan 29, which are assembled on a plate 30, supported by the frame 7. The unit is positioned within the housing 14, as herebefore indicated, with the condenser mounted vertically at the rear thereof, the housing being open at its back to receive it. The fan 29 is mounted directly in front of the condenser and is arranged to pull air through interstices of the condenser to cool it. Baffle plates, not shown, may be placed forwardly of the fan, or the unit, to direct the air flow downwardly and outwardly toward the road level.

A sheave 31, keyed to the shaft of the fan 29, is connected to the rear end of the driven shaft 18 by an overrunning clutch 32 within the boss of the sheave. Thereby, the fan is driven from the engine. The compressor is also driven by the countershaft 18 by one or more flexible belts 33 connecting the sheave 31 with a sheave 34 on the compressor shaft.

The refrigerating unit may also include an electric motor 35, connected to the sheave 31 by one or more flexible belts 36 about the sheave 31 and a sheave 37, which is connected to the shaft of the motors by an overrunning clutch 38 in the boss of the sheave. The arrangement is such that the refrigerating unit may be driven by either the engine of the truck on the electric motor, without making any manual adjustments. This is permitted by the overrunning clutches 32 and 38. Thus, when the truck is parked at a dock its supply line 39 (conveniently, a cable) may be connected quickly to a convenient outlet in a power system. Since the connection of the refrigerating unit is through an overrunning clutch, it is unnecessary to break any connection manually. Conversely, when the motor 35 is disconnected from the power system and the engine 10 is started, the overrunning clutch 38 (pertinent to the motor) automatically disconnects power transmission from the motor.

It is to be understood that the refrigerating unit is intended to be utilized for cooling the refrigerating compartment 8 of the truck. To accomplish this purpose coils (not shown) within the compartment are supplied with a refrigerant from the unit after it has been liquified by the compressor and condenser of the unit.

The operation of the unit is preferably controlled to operate when the temperature in the compartment 8 rises above a predetermined level. Accordingly, a thermostatic switch 40 in the compartment 8 is arranged in a circuit, in a manner well understood in the art, to connect and disconnect the motor 35 according to temperature demands.

To control operation of the unit by the truck engine, an automatically controlled clutch 26 is imposed between two sections of the driven shaft 18. Such a clutch is illustrated and described in application of Alfred C. Ratermann, Serial No. 725,310, filed January 30, 1947, and need not be described here in detail. As specifically shown there it is a hydraulically controlled clutch governed, however, by a circuit 41, open and closed by a thermostatic switch 42, also in the cooling compartment 8. Other types of clutches controllable by means responsive to temperature conditions in the compartment 8 may be employed.

Provision of the clutch 26 is not always required and is required only when operation of the truck is such that probability of excessive refrigeration is present while operating the truck. Trucks of this character are often operated on such a uniform basis that this probability is not present. Of course, manual means of control may be supplied, such as a by-pass for the refrigerant, or a manually controlled clutch.

It may be further understood that the overrunning clutch 32 is not required when a clutch 26 is employed that is automatically disconnected when no power is supplied to its driving member. The clutch as specifically described in said previous application is of that type.

The operation of the device may be obvious from the foregoing description, but a recapitulation will serve to give a ready understanding. When the engine 10 of the truck is running, power will be supplied through the belt 21 to the driven shaft 18; thence through the automatically controlled clutch 26 (in accordance with temperature demands as controlled by the thermostatic switch 42) or the overrunning clutch 32, whichever is employed, to the compressor 28 and the fan 29. The overrunning clutch 38 (pertinent to the motor 35) permits this to be done without turning the rotor of the motor.

When the truck is parked or docked, and its engine stopped, the refrigerating unit may be operated by connecting the line 39 with any convenient source of electrical power. The overrunning clutch 32, or automatic clutch 26, will then in effect disconnect the truck engine (or countershaft 18) from the unit. The motor 35 may be caused to operate according to temperature demands by the thermostatic switch 40.

Various changes may be made in details of construction, within the scope of the appended claims, without departing from the spirit of this invention; parts of the invention may be employed to advantage without the whole; and additions and improvements may be added while retaining the benefits of the invention.

We claim:

1. In a delivery truck having a cooling compartment, a cab forward of the cooling compartment, and an internal combustion engine forward of the cab supplying motive power for the truck, an improved refrigerating system comprising a driven shaft extending longitudinally of the vehicle alongside the engine, transmission sheaves on the forward ends of the crankshaft of the engine and driven shaft respectively, a flexible belt connecting said sheaves, a refrigerating unit including a compressor, a condenser and a cooling fan arranged rearwardly of the engine and occupying at least in part a section of said cab, and power transmission means connecting the rear end of the driven shaft with the compressor and the fan.

2. In a delivery truck having a cooling compartment, a cab forward of the cooling compartment, and an internal combustion engine forward of the cab supplying motive power for the truck, an improved refrigerating system comprising a driven shaft extending longitudinally of the vehicle alongside the engine, transmission sheaves on the forward ends of the crankshaft of the engine and driven shaft respectively, a flexible belt connecting said sheaves, a refrigerating unit including a compressor, a condenser and a cooling fan arranged rearwardly of the engine and lying wholly to one side of the longitudinal median line of the vehicle and occupying at least in part a section of said cab, and power transmission means connecting the rear end of the driven shaft with the compressor and the fan.

3. In a delivery truck having a cooling compartment, a cab forward of the cooling compartment extending from side to side of the vehicle, with a steering wheel and operator's space to one side of the longitudinal median line of the vehicle, and an internal combustion engine forward of the cab supplying motive power for the truck with a crankshaft lying longitudinally of the vehicle, an improved refrigerating system comprising a driven shaft extending longitudinally of the vehicle alongside the engine, transmission sheaves on the forward ends of the crankshaft and driven shaft respectively, a flexible belt connecting said sheaves, a refrigerating unit including a compressor, a condenser and a cooling fan arranged rearwardly of the engine and lying wholly to one side of the operator's space and occupying at least in part a section of the cab, and power transmission means connecting the rear end of the driven shaft with the compressor and the fan.

4. In a delivery truck having a cooling compartment, a cab forward of the cooling compartment extending from side to side of the vehicle, with a steering wheel and operator's space to one side of the longitudinal median line of the vehicle, a door in a wall of the cab opposite the operator's space, and an internal combustion engine forward of the cab supplying motive power for the truck with a crankshaft lying longitudinally of the vehicle, an improved refrigerating system comprising a driven shaft extending longitudinally of the vehicle alongside the engine, transmission sheaves on the forward ends of the crankshaft and driven shaft respectively, a flexible belt connecting said sheaves, a refrigerating unit including a compressor, a condenser and a cooling fan arranged rearwardly of the engine and lying wholly to one side of the operator's space and forwardly of the door opening and occupying at least in part a section of the cab, and power transmission means connecting the rear end of the driven shaft with the compressor and the fan.

5. In a refrigerating system for a vehicle having an internal combustion engine supplying its motive power and arranged with its crankshaft longitudinal of the vehicle, the improvement comprising a driven shaft extending longitudinally of the vehicle alongside the engine, transmission sheaves on the forward ends of the crankshaft of the engine and driven shaft respectively, a flexible belt connecting said sheaves, a refrigerating unit including a compressor, a condenser, a cooling fan and an electric motor, arranged rearwardly of the engine, and power transmission means with overrunning clutches permitting the compressor and fan to be driven selectively by either the driven shaft or the electric motor.

6. In a delivery truck having a cooling compartment, a cab forward of the cooling compartment extending from side to side of the vehicle, with a steering wheel and operator's space to one side of the longitudinal median line of the vehicle, a door in a wall of the cab opposite the operator's space, and an internal combustion engine forward of the cab supplying motive power for the truck with a crankshaft lying longitudinally of the vehicle, an improved refrigerating system comprising a driven shaft extending longitudinally of the vehicle alongside the engine, transmission sheaves on the forward ends of the crankshaft and driven shaft respectively, a flexible belt connecting said sheaves, a housing in the cab occupying a space therein forwardly of the door opening, to one side of said median line of the vehicle, opposite the operator's space, from the floor of the cab upwardly, and open at its rear, a refrigerating unit including a compressor, a condenser and a cooling fan arranged rearwardly of the engine and positioned at least in part within said housing with the condenser adjacent said opening in the housing, and power transmission means connecting the rear end of the driven shaft with the compressor and the fan.

7. In a refrigerating system for a vehicle having an internal combustion engine supplying its motive power and arranged with its crankshaft longitudinal of the vehicle, the improvement comprising a driven shaft extending longitudinally of the vehicle alongside the engine, transmission sheaves on the forward ends of the crankshaft of the engine and driven shaft respectively, a flexible belt connecting said sheaves, a refrigerating unit including a compressor, a condenser, a cooling fan and an electric motor arranged rearwardly of the engine, power transmission means including an overrunning clutch between said driven shaft and said refrigerating unit and an overrunning clutch between said electric motor and said compressor unit and fan, permitting the compressor and fan to be driven selectively by either the driven shaft or the electric motor, a third clutch between said driven shaft and said first overrunning clutch, and thermo-responsive means for controlling the action of said third clutch.

WILLIAM RYAN, Jr.
ALFRED C. RATERMANN.

References Cited in the file of this patent

UNITED STATES PATENTS

| Number | Name | Date |
|---|---|---|
| 1,796,627 | Schmieding | Mar. 17, 1931 |
| 2,017,579 | Anderson | Oct. 15, 1935 |
| 2,056,050 | Harris | Sept. 29, 1936 |
| 2,256,322 | Meyerhoefer | Sept. 16, 1941 |

FOREIGN PATENTS

| Number | Country | Date |
|---|---|---|
| 2,650/31 | Australia | June 23, 1932 |
| 741,080 | France | Feb. 6, 1933 |